M. COOKERLY.

Improvement in Hoes.

No. 132,444.             Patented Oct. 22, 1872.

Witnesses
Thos. H. Hutchins
H. Lowe

Inventor.
Michael Cookerly

UNITED STATES PATENT OFFICE.

MICHAEL COOKERLY, OF BAXTER SPRINGS, KANSAS.

IMPROVEMENT IN HOES.

Specification forming part of Letters Patent No. 132,444, dated October 22, 1872.

*To all whom it may concern:*

Be it known that I, MICHAEL COOKERLY, of Baxter Springs, in the State of Kansas, have invented a certain Improvement in Hoes, of which the following is a specification:

My invention consists in the peculiar shape of the hoe-blade and the manner of its attachment to the handle.

Figure 1:
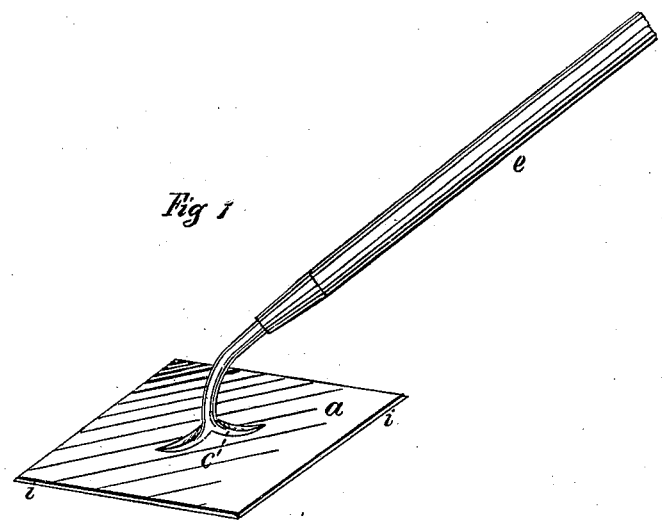
Figure 2:
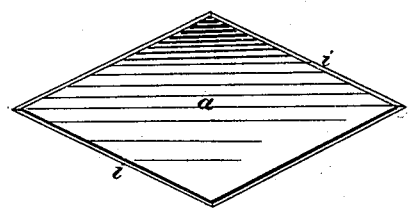

Figure 1 is a perspective view of the hoe, and Fig. 2 is a plan view on the top of the blade.

The shape of the blade is rhomboidal, as shown particularly in Fig. 2 at $a$, and is attached to the handle, as shown in Fig. 1, in a manner so the blade $a$ will be about horizontal while in operation.

The hoe or blade $a$ is of the shape described because it will work easier and be less liable to clog with roots, &c., on the cutting-edges, which extend all round the blade, as shown in Fig. 2 at $i$. It is not intended particularly to dig or chop the earth as with an ordinary hoe, but to be used in a sort of shuffling manner just under the surface to sever the weeds and leave the earth in a loose state or condition.

Some of the advantages of this hoe are, that it does not clog, is much more easily operated, and is sure to destroy the weeds much better than the ordinary hoe.

The hoe-blade $a$ may be constructed of steel or any other suitable metal. The shank $c$ may be either riveted or welded to the blade $a$, as the case may be.

Claim.

Having thus described my invention, what I claim as new, and desire to secure by Letters Patent, is—

The said hoe, as described, as a new article of manufacture.

MICHAEL COOKERLY.

Witnesses:
 W. CRUM,
 D. B. DYER.